No. 894,765. PATENTED JULY 28, 1908.
C. WEEKS.
COMBINED TRAP NEST AND POULTRY COOP.
APPLICATION FILED OCT. 21, 1907.

3 SHEETS—SHEET 1.

Witnesses
J. Milton Jester
L. O. Little

Inventor
Charles Weeks
By Watson E. Coleman
Attorney

No. 894,765. PATENTED JULY 28, 1908.
C. WEEKS.
COMBINED TRAP NEST AND POULTRY COOP.
APPLICATION FILED OCT. 21, 1907.

3 SHEETS—SHEET 2.

Witnesses
J. Milton Jester
L. O. Little

Inventor
Charles Weeks
By Watson E. Coleman
Attorney

No. 894,765.
C. WEEKS.
COMBINED TRAP NEST AND POULTRY COOP.
APPLICATION FILED OCT. 21, 1907.
PATENTED JULY 28, 1908.
3 SHEETS—SHEET 3.
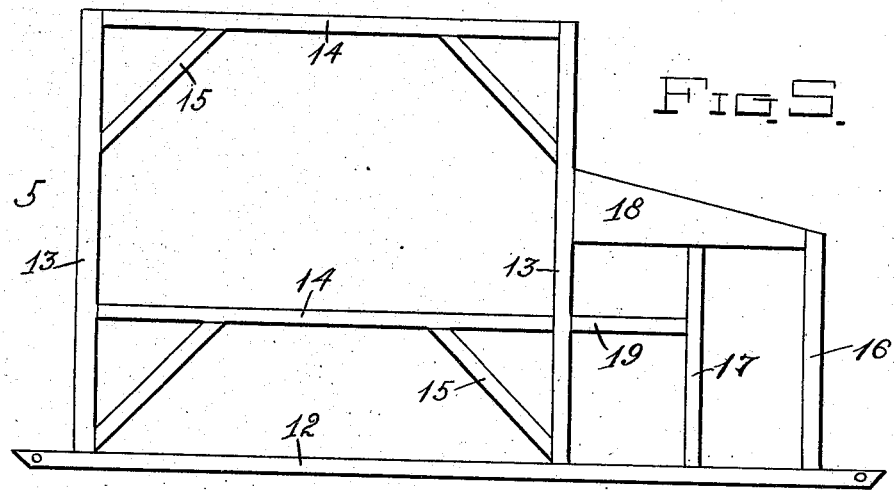
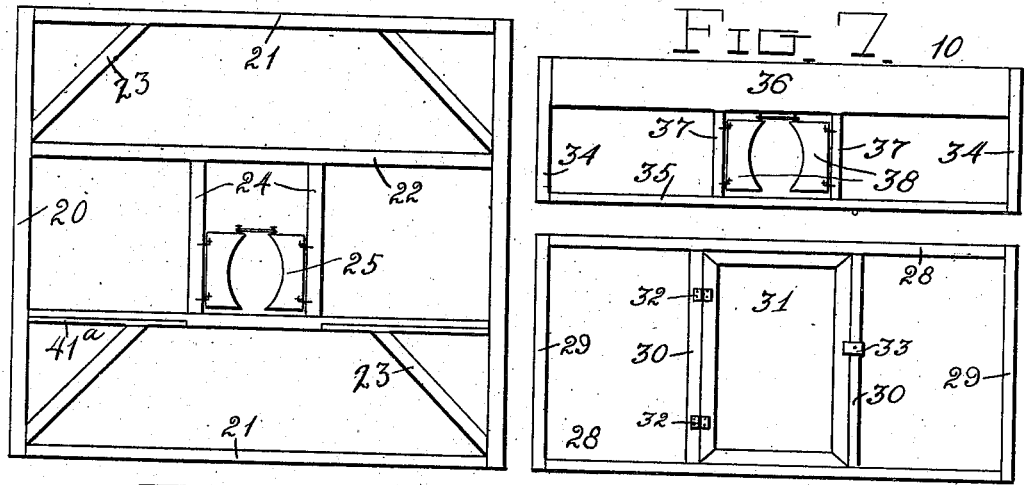
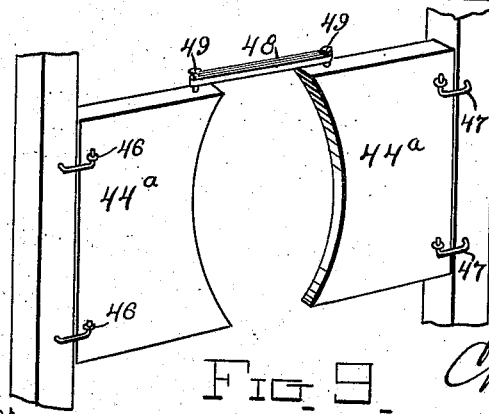
Witnesses
J. Milton Jester
L. O. Little
Inventor
Charles Weeks
By Watson E. Coleman
Attorney

UNITED STATES PATENT OFFICE.

CHARLES WEEKS, OF MOUNTAIN VIEW, CALIFORNIA.

COMBINED TRAP-NEST AND POULTRY-COOP.

No. 894,765.  Specification of Letters Patent.  Patented July 28, 1908.

Application filed October 21, 1907. Serial No. 398,483.

*To all whom it may concern:*

Be it known that I, CHARLES WEEKS, a citizen of the United States, residing at Mountain View, in the county of Santa Clara and State of California, have invented certain new and useful Improvements in a Combined Trap-Nest and Poultry-Coop, of which the following is a specification, reference being had to the accompanying drawings.

My invention relates to improvements in devices for breeding fine poultry and more particularly to a combined trap nest and poultry house or coop.

One object of the invention is to provide a trap nest which has a large, spacious and comfortable confinement compartment into which the hens must enter upon leaving the nest compartment and in which they will be detained until released by the person in charge of them who can thus obtain their numbers or marks for the usual record kept by poultry breeders.

Another object of the invention is to provide a combined poultry coop or house and a nest trap which will be light, strong, durable and inexpensive in construction, well ventilated and healthful and easy to keep clean.

A further object of the invention is to provide a device of this character which will be portable so that it may be readily moved from place to place and which may be readily knocked down or taken apart for convenience in shipping or storing the same.

Figure 1:
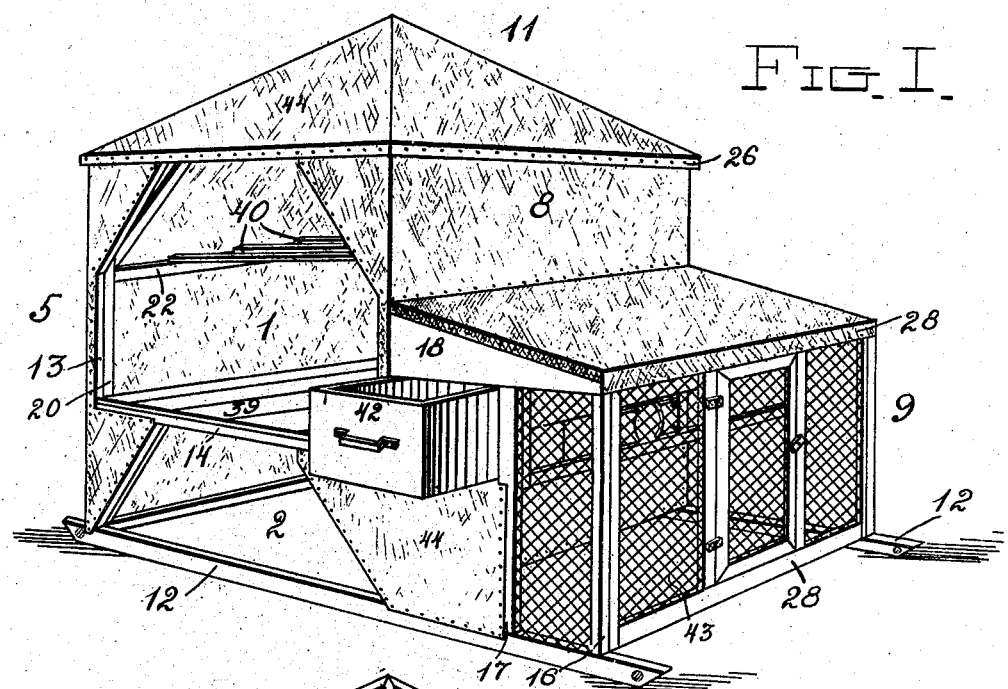
Figure 4:
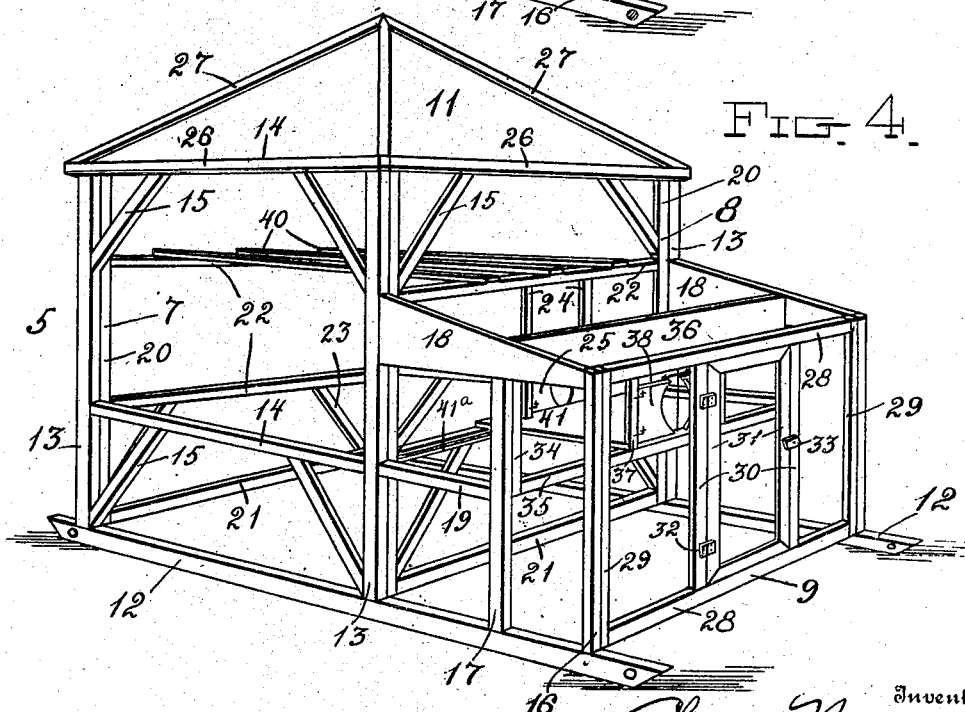
Figure 2:
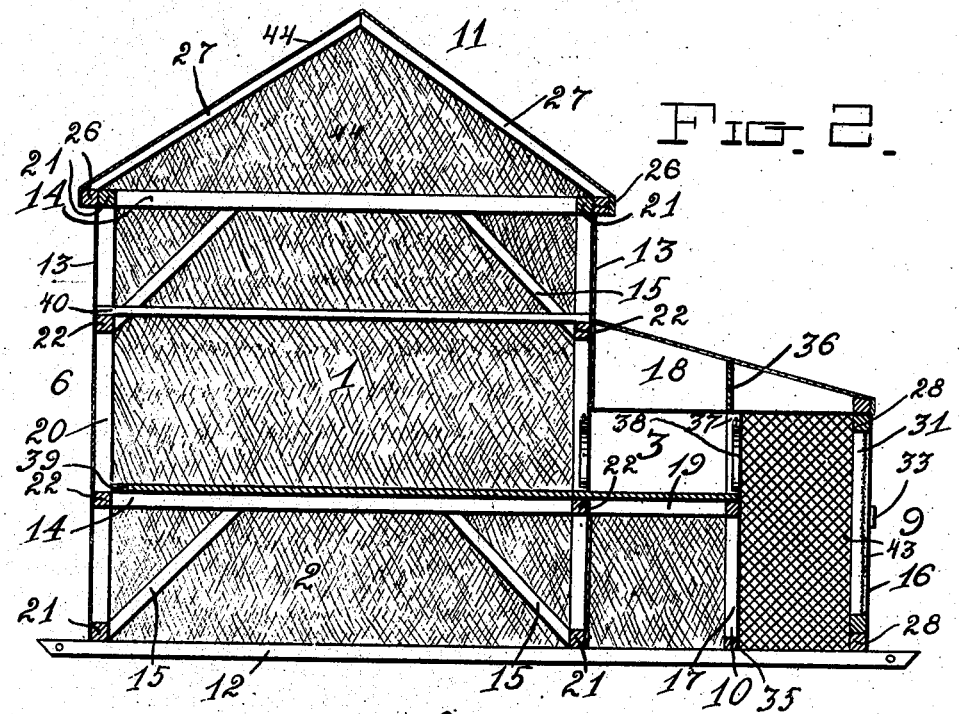
Figure 3:
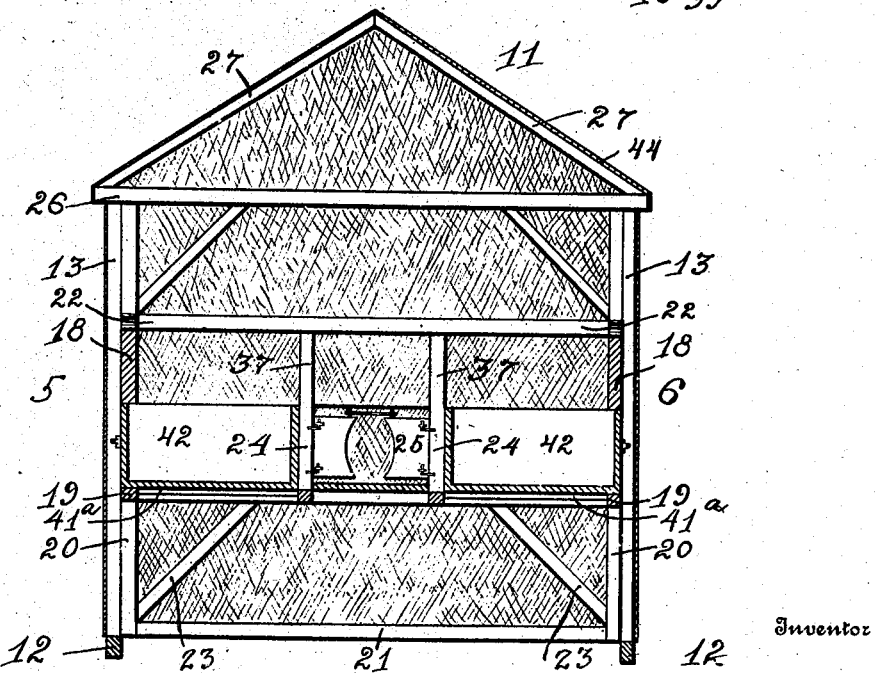

With the above and other objects in view, which will appear as the nature of the invention is better understood, the same consists of the novel features of construction and the combination and arrangement of parts hereinafter described and claimed, and illustrated in the accompanying drawings, in which Figure 1 is a perspective view of my improved combined poultry house and trap nest; Fig. 2 is a vertical longitudinal section; Fig. 3 is a vertical transverse section; Fig. 4 is a perspective view of the frame of the device, its covering being removed; Fig. 5 is a side elevation of one of the side sections of the frame; Fig. 6 is a similar view of one of the end sections of the frame; Figs. 7 and 8 are similar views of the supplemental end section and the partition section; and Fig. 9 is a detail perspective of one of the trap doors.

My invention comprises a light framework constructed preferably of wood and covered with wire netting and canvas or other fabric treated with paraffin or the like to render it water proof. The interior of the device is partitioned as presently explained to provide a roosting chamber 1, a scratching chamber or compartment 2 arranged beneath the latter, a nest compartment 3 and a confinement compartment 4. Said framework is preferably constructed of a plurality of separable sections or frames adapted to be removably connected together by screws or similar fastenings and it is also preferably mounted upon runners so that it may be readily moved from place to place. The preferred construction of the frame consists of two similar front and rear side sections 5, 6, two similar end sections 7, 8, an extra end section 9, a partition section 10 and a top section 11. The side sections 5, 6, each consists of a runner 12 from which rises uprights 13 connected by upper and lower horizontal side bars 14, the latter being also connected to the apparatus by inclined braces 15 as more clearly shown in Fig. 4. Each of said side sections also comprises two uprights 16, 17, rising from the runner 12 and connected at their upper ends to a horizontally disposed triangular shaped board 18 projecting from one of the uprights 13. The upright 17 is also connected to the upright 13 by a horizontal bar 19 arranged beneath the board 18.

Each of the end pieces comprises two uprights 20 connected by top and bottom horizontal bars 21 and intermediate horizontal bars 22, said sections being also provided with diagonal braces 23 which strengthen the connections between the uprights and the horizontal bars. Between the bars 22 of the end section 8 are spaced uprights 24 which support the trap door 25 hereinafter described through which the hens pass in entering the nest.

The top section 11 is in the form of a cap adapted to fit upon the upper ends of the side and end sections and it consists of four side bars 26 and four upwardly and inwardly inclined bars 27 which latter have their converging ends united and their opposite ends secured to the united ends of the bars 26 as shown.

The supplemental end section 9 consists of upper and lower horizontal bars 28 connected by end uprights 29 and intermediate uprights 30 which latter form a door opening adapted to receive a door 31 which is hinged at one side as shown at 32 and provided with a suitable catch 33.

The partition 10 consists of two end uprights 34 united by a lower horizontal bar 35 and an upper bar or board 36. Between the parts 35, 36, are spaced uprights 37 adapted to support a trap door 38 through which the hens pass in leaving the nest compartment.

In assembling the above described sections of the frame, the end sections 7, 8 are arranged between the side sections 5, 6, and the uprights 20 are united to the uprights 30 by screws or other removable fastenings. The top section is then placed in position and its bars 26 secured to the upper bars 6, 21, of said side and end sections by screws or the like. A flooring 39 is then arranged upon the lower bars 14, 22, of the side and end sections to divide the portion of the frame between the latter into the upper roosting compartment or chamber 1 and the lower scratching compartment 2. Perches 40 are then removably arranged in the roosting compartment upon the upper horizontal bars 22 of the sections 7, 8. The supplemental end section 9 is then similarly secured between the uprights 16 and the partition section 10 is secured between the upper portions of the uprights 17. A platform 41 is then arranged between the partition 10 and the end section 8 so as to bridge the space between the inlet trap door 25 and the outlet trap door 38. I also provide two nest boxes 42 which are slidably arranged in the opposite sides of the device and are supported upon the cross bars 19 and the cleats 41ª as shown in Fig. 3.

After the framework has been set up as above described, its sections are covered preferably as shown, that is to say, the outer sides and ends of the waiting or confinement chamber 4 are covered with wire netting 43 or the like and the other covered portions of the structure are covered with canvas or other fabric 44 treated with paraffin or the like which renders the same water proof. By treating the canvas with paraffin the same is rendered almost transparent so that the interior of the device is well lighted and therefore keeps dry and clean.

It will be noted that the front of the roosting and scratching compartments are open so that they are well ventilated. The canvas covering the top and sides of the nest compartment is preferably painted a dark color so as to darken said compartment.

Each of the trap doors 25, 38 is similar in construction and consists of two swinging door members 44 so constructed and mounted that they swing in but one direction and are normally held in their closed position. Said door sections 44 are hung by hinges consisting of screw eyes 46 carried by said door sections and engaged with screw hooks 47 upon their supporting uprights, said hinges being so disposed that the straight inner edges of the door sections will abut their supporting uprights and limit the movement of the door sections in one direction. The door sections are held normally in their closed position by a spring closing device which may be of any suitable form and construction but which as illustrated consists of an elastic band or loop 48 engaged by screws or nails 49 arranged in the upper inner corners of the door sections as clearly shown in Fig. 3. The opposing edges of the door sections are recessed or concaved as shown so that a hen may readily insert her head between said door sections and then force said door sections open as will be understood upon reference to the drawings. It will be noted that both trap doors open in the same direction so that a hen after entering the nest compartment through the door 25 can only leave the same through the door 38.

The construction, use and advantages of my invention will be readily understood from the foregoing description taken in connection with the accompanying drawings and the following brief statement. The provision of the large and spacious waiting or confinement compartment 4 for the reception of the hens after leaving the nest compartment dispenses with the necessity of the person in charge constantly coming to the device and opening the door 31 to free the hens. The device therefore requires less attention than other trap nests since it need only be attended at reasonable intervals during the day. The construction of this confinement chamber or compartment is also such that the numbers or marks upon the leg bands of the hens can be readily read before the hens are set at liberty.

It will be noted that the construction of the trap doors is such that each hen is trapped as soon as she enters the nest compartment and that as soon as she has laid her egg she can pass on through the outer trap door into the comfortable waiting coop or compartment below. Owing to the construction and mounting of the trap doors it will be seen that they are always ready for action and that no hen need wait to enter the nest.

The combination of the trap device with the roosting and scratching compartments renders the device exceedingly desirable and convenient for the use of poultry breeders and the peculiar construction of its parts renders it neat, light, clean, well ventilated and healthful and comparatively inexpensive.

Having thus described my invention what I claim is:

1. In a device of the character described, a portable structure adapted to rest upon the ground and having a bottomless confinement compartment, an elevated nest arranged within the confinement compartment and having inlet and outlet door openings, inlet and outlet trap doors arranged in said openings, said outlet trap door being adapted to open into the confinement compartment and an outlet door for said confinement compartment, substantially as described.

2. In a device of the character described, a confinement compartment, an elevated nest compartment arranged within the confinement compartment and having oppositely disposed door openings, a platform between said door openings, nest boxes slidable in the nest compartment on opposite sides of the platform and trap doors arranged in said door openings, said trap doors being self actuated to their closed positions and adapted to open in the same direction, one serving as an entrance for the nest compartment and the other as an outlet from the nest compartment to the confinement, substantially as described.

3. A combined poultry house and trap nest comprising a covered framework partitioned to provide a roosting compartment, a scratching compartment arranged beneath the latter, a nest compartment arranged to one side of the roosting compartment, a confinement compartment arranged to one side of and beneath the nest compartment, an inlet trap door between the roosting and nest compartment, and an outlet trap door between the nest and confinement compartments, substantially as described.

4. A combined poultry house and trap nest comprising a covered framework consisting of separable frame sections and partitions, providing an elevated roosting compartment, a lower scratching compartment, an elevated nest compartment and a lower confinement compartment, inlet and outlet trap doors for the nest compartment and supporting runners for the framework, substantially as described.

5. A combined poultry house and trap nest comprising a framework consisting of two side sections having supporting runners, two end sections between the side sections, a top section engaged with said side and end sections, a supplemental end section between the side sections, a partition section, a flooring within the framework to provide an upper roosting compartment and a lower scratching compartment, perches in the roosting compartment, nest boxes in the nest compartment formed between the partition section and one of said end sections, inlet and outlet trap doors for the nest compartment, a platform in the nest compartment between said trap doors and said nest boxes and covering upon said frame sections, substantially as described.

6. In a trap nest, the combination with a door frame of trap doors, screw eyes arranged thereon, screw hooks upon the door frame to receive said eyes and hingedly mount said door sections, the movement of the latter in one direction being limited by their engagement with the door frame, projections upon the door sections and an elastic connection between said projections to hold the door sections normally closed, substantially as described.

7. A combined poultry house and trap nest, comprising a covered framework consisting of separable frame sections and partitions, providing an elevated roosting compartment, a lower scratching compartment, an elevated nest compartment and a lower confinement compartment, and inlet and outlet trap doors for the nest compartment, the outlet trap door opening into the confinement compartment, substantially as described.

8. A combined poultry house and trap nest, comprising a covered framework having an elevated roosting compartment, a lower scratching compartment, an elevated nest compartment and a lower confinement compartment, said scratching and confinement compartments being bottomless, supporting runners for the framework, and inlet and outlet trap doors for the nest compartment, the outlet door being adapted to open into the confinement compartment, substantially as described.

In testimony whereof I hereunto affix my signature in the presence of two witnesses.

CHARLES WEEKS.

Witnesses:
　E. Z. CAROTHERS,
　E. M. LOGUE.